United States Patent [19]

Hert et al.

[11] Patent Number: 6,136,920

[45] Date of Patent: Oct. 24, 2000

[54] MULTIPHASE THERMOPLASTIC COMPOSITIONS

[75] Inventors: Marius Hert; Patrice Perret, both of Serquigny, France

[73] Assignee: Elf Atochem S.A., Paris, France

[21] Appl. No.: 08/393,746

[22] Filed: Feb. 24, 1995

[30] Foreign Application Priority Data

Mar. 4, 1994 [FR] France ................................. 94 02521

[51] Int. Cl.⁷ ........................... C08L 35/00; C08L 37/00; C08L 67/02; C08L 77/00
[52] U.S. Cl. ............................ 525/66; 525/64; 525/166; 525/176; 525/182; 525/183
[58] Field of Search ............................ 525/166, 66, 182, 525/183

[56] References Cited

U.S. PATENT DOCUMENTS

| | | | |
|---|---|---|---|
| 3,373,223 | 3/1968 | Armstrong | 260/857 |
| 4,172,859 | 10/1979 | Epstein | 525/174 |
| 4,174,358 | 11/1979 | Epstein | 525/183 |
| 4,485,214 | 11/1984 | Ochiai et al. | 525/179 |
| 4,554,320 | 11/1985 | Reimann et al. | 525/183 |
| 4,898,911 | 2/1990 | Miyashita et al. | 525/74 |
| 4,914,152 | 4/1990 | Miyashita et al. | 525/68 |
| 5,070,145 | 12/1991 | Guerdoux | 525/179 |
| 5,151,466 | 9/1992 | Phadke | 525/177 |
| 5,157,070 | 10/1992 | Orikasa | 525/166 |
| 5,175,204 | 12/1992 | Orikasa | 525/166 |
| 5,208,292 | 5/1993 | Hert | 525/166 |
| 5,244,972 | 9/1993 | Phadke | 525/66 |
| 5,244,973 | 9/1993 | Sakouzume | 525/166 |
| 5,292,808 | 3/1994 | Ohmae et al. | 525/113 |

FOREIGN PATENT DOCUMENTS

| | | | |
|---|---|---|---|
| 2093271 | 10/1993 | Canada . | |
| 268280 | 5/1988 | European Pat. Off. | 525/166 |

*Primary Examiner*—Patricia A. Short
*Attorney, Agent, or Firm*—Pennie & Edmonds LLP

[57] ABSTRACT

The present invention relates to a multiphase thermoplastic composition consisting of a mixture (I) including at least one ethylene polymer (A) which has units derived from unsaturated epoxy and at least one thermoplastic resin (B) partly encapsulated by the said ethylene polymer (A), the said mixture (I) being dispersed in a matrix of thermoplastic resin (C).

11 Claims, 2 Drawing Sheets

MULTIPHASE THERMOPLASTIC COMPOSITIONS

FIELD OF THE INVENTION

The invention relates to a multiphase thermoplastic composition which has an improved flexibility, impact strength, especially at low temperature, and delamination behaviour.

The invention relates especially to a thermoplastic composition consisting of a phase containing at least one thermoplastic resin and at least one ethylene polymer which has units derived from unsaturated epoxide or unsaturated acid anhydride, the said phase being dispersed in a matrix based on a thermoplastic resin. The invention also relates to a process for the preparation of the thermoplastic composition.

A further subject of the invention is the articles obtained from the said composition.

BACKGROUND OF THE INVENTION

Compositions with a polyamide or polyester matrix and ethylenic polymers are already known for their impact strength.

Patent EP 096 264 describes a material of high impact strength, containing:
  a thermoplastic nylon which has a relative viscosity of 2.5 to 5, and
  from 5 to 60% by weight, relative to the thermoplastic nylon, of an uncrosslinked terpolymer consisting of:
    55 to 79.5% by weight of ethylene,
    20 to 40% by weight of at least one primary or secondary alkyl (meth)acrylate, and of
    0.5 to 8% by weight of a functionally acidic monomer (for example maleic anhydride).

Patent EP 218 665 describes compositions containing from 50 to 95% by weight of at least one polyamide resin and 5 to 50% by weight of at least one ethylene polymer containing from 0.9 to 16 mol % of units derived from maleic anhydride and/or at least one alkyl acrylate or methacrylate in which the alkyl group has from 1 to 6 carbon atoms.

The said ethylene polymer is present in the form of a mixture of ethylene/alkyl (meth)acrylate copolymer (A) and of ethylene/maleic anhydride/alkyl (meth)acrylate terpolymer (B), the molar ratio (A)/(B) being between ⅓ and 3.

Document EP-A-072,480 is also known, which describes an impact-resistant composition including from 50 to 90% by weight of polyamide, from 1 to 45% by weight of an ethylenic ionomer resin and from 0.5 to 40% by weight of an elastomeric ethylenic copolymer.

U.S. Pat. No. 3,373,223 describes a polymer blend consisting essentially of 25 to 90% by weight of polyolefin, 5 to 70% by weight of polyamide and 1 to 10% by weight of an ethylene/(meth)acrylic acid copolymer.

Patent EP 268287 describes an impact-resistant composition including:
  (a) a thermoplastic polyester
  (b) 1 to 100 parts of a polymer containing at least one epoxy group per molecule and having a flexural elasticity modulus of not more than $10^4$ kg/cm$^2$ at ambient temperature, and
  (c) 0.5 to 100 parts of a copolymer of α-olefin and of an α,β-unsaturated carboxylic acid, in which at least 5 mol % of the carboxylic groups are neutralized with an alkali metal,
the parts being parts by weight per 100 parts by weight of the compound (a).

Patent EP 382539 describes a polyamide resin composition including:
  (A) 60 to 97 parts by weight of a polyamide resin containing at least 2 parts by weight of a polyamide resin which has an end COOHs/end NH$_2$s ratio of at least 1.5,
  (B) 3 to 40 parts by weight of an ethylene terpolymer including 0.3 to 10% of maleic anhydride units,
    5 to 60% of alkyl acrylate units and 40 to 90% of ethylene units,
    and 0.01 to 20 parts by weight per 100 parts by weight of the sum (A) and (B) of a crosslinking agent which is a polyfunctional compound containing at least two groups which are reactive towards the anhydride groups of (B).

In this composition a part of the polyamide resin (A) forms the matrix, the terpolymer (B) forms a so-called first-order disperse phase and the remainder of the polyamide resin of (A) forms a so-called second-order disperse phase.

Although these compositions exhibit an improved impact strength when compared with the polyamide matrix employed by itself, this improvement remains, however, insufficient for many applications requiring an excellent impact strength, especially at low temperature.

Furthermore, because of the crosslinking, these compositions exhibit high flexural moduli, and this is unacceptable when compositions which have a high flexibility are being sought.

Summary of the Invention

The present invention provides a multiphase thermoplastic composition comprising a mixture (I) that includes at least one ethylene polymer (A) which has units derived from unsaturated epoxy monomers or from unsaturated acid anhydride monomers, and at least one thermoplastic resin (B) which is partially encapsulated by the said ethylene polymer (A). According to the invention, the mixture (I) is dispersed in a matrix that includes at least one thermoplastic resin (C), wherein the respective melting temperatures of the thermoplastic resins (B) and (C) are such that thermoplastic resin (B) remains partially encapsulated by ethylene polymer (A) during the manufacture or use of the composition. The present invention also provides methods for the manufacture and use of the compositions of the invention.

DESCRIPTION OF THE PREFERRED EMBODIMENTS

Figure 1:
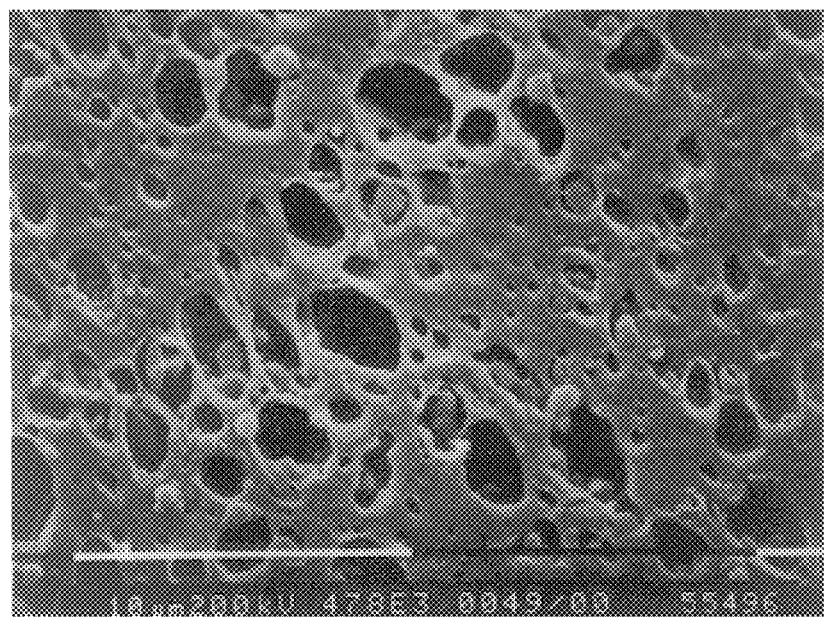
FIG. 1 is a Scanning Electron Microscope (SEM) photograph of the composition of Example 9 from which the ethylene polymer (A) has been extracted in order to show nodules of PA 6—6 dispersed in the PA 6 matrix.

A multiphase thermoplastic composition based on thermoplastic resin is provided that includes a mixture (I) including at least one ethylene polymer (A) which has units derived from unsaturated epoxy or from unsaturated acid anhydride and at least one thermoplastic resin (B) partly encapsulated by the said ethylene polymer (A), the said mixture (I) being dispersed in a matrix including at least one thermoplastic resin (C).

The thermoplastic resins (B) and (C) have melting temperatures such that (B) remains partly encapsulated by (A) during the preparation or the use of the compositions of the invention.

It is not necessary for the melting temperature $T_c$ of (C) to be lower than the melting temperature of (B) if the conversion time and the temperature profile of the machines employed are such that (B) does not have the time to be completely melted and remains partly encapsulated by (A).

According to a preferred embodiment of the present invention the multiphase thermoplastic composition based on thermoplastic resin is characterized in that 100 parts by weight of the mixture (I) include:

35 to 90 parts by weight of at least one ethylene polymer (A) which has units derived from unsaturated epoxy or from unsaturated acid anhydride, and 10 to 65 parts by weight of at least one thermoplastic resin (B);

the said 100 parts of the mixture (I) being dispersed in a matrix including at least one thermoplastic resin (C).

According to another embodiment of the present invention the 100 parts by weight of the mixture (I) are dispersed in 80 to 2000 parts by weight of a matrix including at least one thermoplastic resin (C).

According to another embodiment of the invention the melting temperature $T_c$ of the thermoplastic resin (C) is lower than the melting temperature of the thermoplastic resin (B). This temperature difference may be, for example, 20° C.

According to the present invention the thermoplastic resins (B) and (C) may be chosen from the group including polyamide resins, polyester resins free from aliphatic unsaturation and resins containing polyether blocks and polyamide blocks.

According to the present invention a polyamide resin denotes a resin produced by polycondensation of one or more amino acids such as aminocaproic, 7-aminoheptanoic and 11-aminoundecanoic acids or equimolar quantities of a saturated dicarboxylic acid containing from 4 to 12 carbon atoms with a diamine which may contain from 4 to 14 carbon atoms.

By way of illustration of such polyamide resins there will be mentioned:

poly(hexamethylene adipamide)(polyamide 6-6),
poly(hexamethylene azelamide)(polyamide 6-9),
poly(hexamethylene sebacamide)(polyamide 6-10),
poly(hexamethylene dodecanediamide)(nylon 6-12),
poly(undecanoamide)(polyamide 11).

It is also possible to employ in the present invention polyamides prepared by polycondensation of at least two of the monomers and polymers mentioned above, which produces copolyamides.

By way of illustration of such copolyamides there may be mentioned copolyamide 6—6 and 6, and copolyamide 12-6 and 6.

The polyamide resins of the present invention can also be produced by polymerization of one or more lactams such as caprolactam, which produces polyamide 6, or lauryllactam, which produces polyamide 12.

It is also possible to employ in the present invention semiaromatic polyamides or copolyamides produced by polycondensation of one or more diacids at least one of which contains an aromatic nucleus, with equimolar quantities of an aliphatic, cycloaliphatic or aromatic diamine which may contain from 4 to 14 atoms. The polymers containing polyether blocks and polyamide blocks result from the condensation of polyamide blocks with carboxylic acid ends with polyether diols or polyether diamines or a mixture thereof.

According to the present invention the thermoplastic resins (B) and (C) may be chosen from polyamide resins such as polyamides 6—6, 6-9, 6-10, 6, 11 and 12.

It is possible, for example, to employ PA-6,6 or PA-6 for (B) and PA-11, PA-12 or PA-6 for (C).

A polyester resin free from aliphatic unsaturation refers here to a thermoplastic resin obtained by the action of an aromatic or cycloaliphatic dicarboxylic diacid on an alkylene glycol in which the alkylene group, which may be linear, branched or cycloaliphatic, has up to 10 carbon atoms.

By way of illustration of aromatic dicarboxylic acid there may be mentioned terephthalic acid, isophthalic acid and 2,6-naphthalenedicarboxylic and 4,4'-diphenylenedicarboxylic acid.

By way of illustration of cycloaliphatic diacid there may be mentioned 1,4-cyclohexanedicarboxylic acid.

By way of illustration of alkylene glycol there may be mentioned ethylene glycol, 1,4-butanediol, 1,5-pentanediol, 1,6-hexanediol, 1,4-cyclohexanedimethanol, 2,2-dimethyl-1,3-propanediol and 2,2-bis(4-hydroxycyclohexyl)propane.

Polyethylene terephthalate (PET) and polybutylene terephthalate (PBT) may be mentioned as illustrations of polyester resin.

It would not constitute a departure from the scope of the invention if mixtures of at least two abovementioned resins were employed as polyester resin.

According to the present invention the thermoplastic resin (C) may be chosen from polyester resins such as PET, PBT or mixtures thereof.

Among these polyesters the invention relates very particularly to PBT as thermoplastic resin (C).

With regard to the unsaturated epoxides forming part of the ethylene polymer (A) special mention may be made of aliphatic glycidyl esters and ethers such as glycidyl acrylate, glycidyl methacrylate, glycidyl maleate, glycidyl itaconate, vinyl glycidyl ether and allyl glycidyl ether.

Among these unsaturated epoxides very particular preference is given to the use of glycidyl acrylate or glycidyl methacrylate.

By way of example, the ethylene polymer (A) may be chosen from ethylene/unsaturated epoxide copolymers and ethylene/alkyl (meth)acrylate/unsaturated epoxide terpolymers.

For example, the ethylene/alkyl (meth)-acrylate/unsaturated epoxide terpolymers may include from 0.2 to 5 mol % of at least one unit derived from an unsaturated epoxide and from 1 to 15 mol % of at least one unit derived from an alkyl acrylate or methacrylate and have a melt index of between 1 and 50 g/10 min, measured according to NFT standard 51-016 (conditions: 190° C./2.16 kg load).

The alkyl group in the alkyl acrylate or methacrylate forming part of the ethylene/alkyl (meth)acrylate/unsaturated epoxide terpolymer may be linear, branched or cyclic and has up to 10 carbon atoms.

By way of illustration of alkyl acrylate or methacrylate forming part of the terpolymer special mention may be made of methyl acrylate, ethyl acrylate, n-butyl acrylate, isobutyl acrylate, 2-ethylhexyl acrylate, cyclohexyl acrylate, ethyl methacrylate and methyl methacrylate. Among these alkyl acrylates and methacrylates those very particularly preferred are ethyl acrylate, n-butyl acrylate and methyl methacrylate.

The polymer (A) may also be a copolymer of ethylene and of an unsaturated acid anhydride, advantageously a carboxylic acid anhydride, such as, for example, maleic anhydride.

By way of example, (A) may be an ethylene/alkyl (meth) acrylate/maleic anhydride copolymer.

The alkyl (meth)acrylates are, for example, those already described above in the case of the copolymers (A) containing epoxy units.

It would not constitute a departure from the scope of the invention if the unsaturated epoxide and unsaturated acid anhydride functional groups were introduced by grafting onto a polyethylene or an ethylene copolymer to form (A).

According to the present invention from 35 to 90 parts by weight of at least one ethylene polymer (A) and, preferably, from 50 to 80 parts by weight, and from 10 to 65 parts by weight of at least one thermoplastic resin (B) and, preferably, from 20 to 50 parts by weight, may be employed in the mixture (I).

The Applicant Company has found that by dispersing 100 parts by weight of the mixture (I) in 80 to 2000 parts by weight and, preferably in 120 to 500 parts by weight, of a matrix including at least one thermoplastic resin (C), so that (B) remains partly encapsulated by (A), it obtained a thermoplastic composition which had an improved impact strength, especially at low temperature, and a great flexibility and an improved delamination resistance.

The thermoplastic composition forming the subject of the present invention may be produced in a number of ways.

According to a first alternative form the composition is produced in two stages.

In a first stage the mixture (I) is produced by any melt-kneading technique by means of conventional tools ensuring a good dispersion, such as a Buss co-kneader, a single-screw extruder, an extruder with twin corotative and counterrotative screws or an internal mixer.

The composition is next produced in a second stage by kneading (I), which is generally in the form of granulate, with the thermoplastic resin (C) in such a way that the kneading temperature is-higher than the melting point of the thermoplastic resin (C).

Like the first one, this second stage can be advantageously carried out by means of any kneading equipment ensuring a good dispersion. Buss-type co-kneaders and corotative twin-screw extruders are particularly suitable for this purpose.

According to a preferred method of the invention the composition may be produced in a single stage.

The mixture (I) is produced in the first zones of a kneading tool such as a Buss-type co-kneader equipped with a degassing well and with at least two feed zones and the thermoplastic resin (C) is then introduced with the aid of a metering device into a zone situated upstream of the zone for mixing the constituents (A) and (B) of the mixture (I).

As in the 2-stage process, a strict heat profile must be conformed to; it is especially advantageous to have a temperature which is higher than the melting point of the compound (C) in the zone for kneading the mixture (I) with the thermoplastic resin (C).

In either variant it is advantageous before the melt-kneading to perform a mixing (generally dry) of the components (A) and (B), which may be in the form of powders or of granulates, by means of a mixer such as a Henschel or Turbula mixer.

This is particularly indicated when it is desired to add to the thermoplastic composition various additives such as stabilizers, demoulding agents, lubricants, crystallization accelerators, plasticizers, pigments, dyes or inorganic fillers.

According to an alternative form it is also possible to stiffen the compositions described above by adding to them a high proportion of inorganic fillers, advantageously up to 50 parts by weight of at least one inorganic filler per 100 parts by weight of the total of the components (A), (B) and (C). The inorganic filler, pulverulent or in the form of fibres or flakes, may, for example, be chosen from glass fibres, ballotini, mica, talc, clays, aluminates and silicates, for example those of calcium, alumina, alumina hydrate, carbon black, carbon or boron fibres, asbestos, magnesium or calcium oxides, hydroxides, carbonates and sulphates, iron, antimony and zinc oxides, titanium dioxide, barium sulphate, bentonite, diatomaceous earth, kaolin, silica such as quartz and feldspar.

The thermoplastic compositions obtained are in the form of granulates. They are next dried at reduced pressure at a temperature of, for example, 80° C. or above, and are then injection-moulded by means of a press of the Krauss-Maffei 80/60 or Billion 80/50 type at temperatures of between 240° C. and 280° C. into standardized test pieces in order to perform the various tests enabling the mechanical and morphological properties to be evaluated.

The multiphase thermoplastic composition according to the present invention has a structure such that the ethylene polymer (A) may be found in the form of nodules and that the thermoplastic resin (B)-may be found in the form of nodules partly encapsulated by the said ethylene polymer (A).

These nodules have a volume-average diameter Dv of at least a micron and, preferably, between 1 and 3 microns.

The volume distribution curve of the said nodules shows that there is a volume percentage of at least 50% and preferably between 60 and 98% of nodules which have a diameter greater than a micron.

Another subject of the present invention relates to articles obtained from at least one composition described above. These articles may be obtained by any conventional methods employed in the thermoplastics industry, especially injection-moulded articles or those obtained by extrusion (casings, hollow bodies, bottles, films, embellishers).

The multiphase thermoplastic compositions obtained within the scope of the present invention have an improved impact strength, especially at low temperature, and a high flexibility associated with an increased resistance to delamination and to oils, which makes them particularly advantageous for any application demanding these qualities, most particularly in the transport and electronics industries sectors.

The following examples illustrate the invention.

The compositions were prepared by employing the following products:

an ethylene/ethyl acrylate/maleic anhydride terpolymer—denoted by PO hereinafter—containing 68% by weight of units derived from ethylene, 30% by weight of units derived from ethyl acrylate and 2% by weight of units derived from maleic anhydride, exhibiting a melt index of 7 g/10 min, measured according to ASTM standard D 1238 at 190° C. under a 2.16 kg load, and having a melting point of 65° C., measured by DSC;

an ethylene/ethyl acrylate/glycidyl methacrylate terpolymer—denoted by P1 hereinafter—containing 68% by weight of units derived from ethylene, 24% by weight of units derived from ethyl acrylate and 8% by weight of units derived from glycidyl methacrylate, exhibiting a melt index of 6 g/10 min, measured according to ASTM standard D 1238 at 190° C. under a 2.16 kg load, and having a melting point of 63° C., measured by DSC;

a polyamide 6—6 -denoted by PA 6—6 hereinafter—which has a melting point of 260° C., determined according to ASTM standard D-3417;

a polyamide 6—denoted by PA 6 hereinafter—which has a melting point of 220° C, determined according to ASTM standard D 789;

a polyamide 12—denoted by PA 12 hereinafter—exhibiting a melting point of 175° C.;

a polybutylene terephthalate—denoted by PBT hereinafter—which has a melting point of 225° C., determined according to ASTM standard D 789 and a Vicat point under 10 MPa of 218° C., determined according to ASTM standard D 1515.

Preparation of the Thermoplastic Compositions

A Buss PR 46/70 co-kneader (L/D=15) is employed, fitted with a restart screw, a feed hopper $E_l$, and a feed $E_2$ situated approximately ⅔ upstream in relation to the feed hopper $E_l$.

The speed of rotation of the kneading screw is 200 rev/min and the speed of rotation of the restart screw is 33 rev/min.

The throughput is 20 kg/h.

The Buss co-kneader is equipped with temperature gauges TM 1, TM 2, TM 3, TM 4 and TM 5 which are arranged along the kneading and restart screw.

These temperature gauges indicate the temperature of the barrels in which they are placed.

The compositions of Examples 2, 4 and 7 (Table 1) and 8, 9 and 10 (Table 2) were produced by the one-stage process.

The compositions of Examples 6 (Table 1) and 11, 12, 13 and 14 (Table 3) were produced by the two-stage process.

One-Stage Process

Into the feed hopper Eof such a co-kneader is introduced a mixture (I) consisting of a terpolymer (A) and of a thermoplastic resin (B) whose proportions, expressed in parts by weight, are shown in Tables 1 and 2 (it being known that (A)+(B) corresponds to 100 parts).

A thermoplastic resin (C) is simultaneously introduced at $E_2$ with the aid of a Soder type metering device, in proportions shown in Tables 1 and 2.

The temperature profile is a function of the polymers employed and is shown in Tables 1 and 2 under headings TM 1, TM 2, TM 3, TM 4 and TM 5, it being known that temperatures TM 1 and TM 2 represent the temperatures of the barrels corresponding to the kneading temperatures of the mixture (I) before introduction of the thermoplastic resin (C); TM 3, TM 4 and TM 5 represent the kneading temperatures of the mixture (I) with the thermoplastic resin (C).

The compositions obtained are granulated.

Two-Stage Process

The same Buss PR 46/70 co-kneader is employed.

Feed $E_2$ is removed.

The parameters (speed of the screws and throughput) are identical with the parameters of the one-stage process.

The mixture (I) is produced in a first step by feeding the feed hopper $E_1$ of the said co-kneader with a mixture consisting of a terpolymer (A) and a thermoplastic resin (B) whose proportions, expressed in parts by weight, are shown in Tables 1 and 3.

The extrusion is carried out at temperatures of between 250 and 280° C.

The mixture obtained is granulated.

The granules are then dried at reduced pressure for 24 hours at 80° C.

In a second step the feed hopper E1 of the said co-kneader is fed with on the one hand, the mixture (1) obtained previously, and on the other hand, a thermoplastic resin (C) in proportions, expressed in parts by weight as shown in Tables 1 and 3, it being known that (A)+(B) corresponds to 100 parts of the mixture (I).

The extrusion temperature profile is shown in the tables below.

The compositions obtained are granulated.

The granulates obtained according to the one-stage or two-stage process are dried at reduced pressure for 24 hours at 80° C. and then injection-moulded on a Krauss-Mafei 80/60 press at temperatures of between 250° C. and 270° C. and with an injection pressure of 50 MPa.

The Charpy impact strength and the flexural modulus are determined on the standardized test pieces obtained and the tensile test is performed to determine, in particular, the elongation at the weld join line.

Charpy Impact Strength

Measured according to ISO Standard 179 on V-notched 120×10×4 mm test pieces.

The measurements are performed at 23° C., −20° C. and −40° C.

Flexural Modulus

Measured according to ISO Standard 178.

Tensile Test: determination of the elongation at the weld join line (WJL).

This test is carried out according to ISO Standard R 527 on test pieces 115×10×4 mm in size injection-moulded via both ends, which produces a central weld join line.

Morphology Study

Planing is performed at low temperature (−60° C.), followed by an extraction with hot xylene, of the ethylene polymer (A) and the disperse phase is inspected by means of a Phillips model SEM 505 scanning electron microscope (SEM).

In order to measure the diameter of the nodules of the disperse phase the ethylene polymer (A) is selectively extracted and a planing of the surface of the sample is carried out at low temperature (−60° C.) with the aid of a glass knife and the sample is inspected with the SEM.

The image obtained is analysed with an image analyser of the IBAS 2000 type, which makes it possible to obtain the nodule diameters and to establish the volume distribution curves of the said nodules.

The combined results of the mechanical tests are collated in Tables 1, 2 and 3.

In these tables the parts are expressed as weights.

The multiphase thermoplastic compositions according to the invention—Examples 2, 4, 6 and 7 (Table 1) and 9 and 11 (Table 2)—exhibit, at the same elastomer content, lower moduli and a higher impact strength than the single-phase thermoplastic compositions of the comparative Examples 1, 3 and 5 (Table 1) and 8 and 10 (Table 2).

Figure 2:
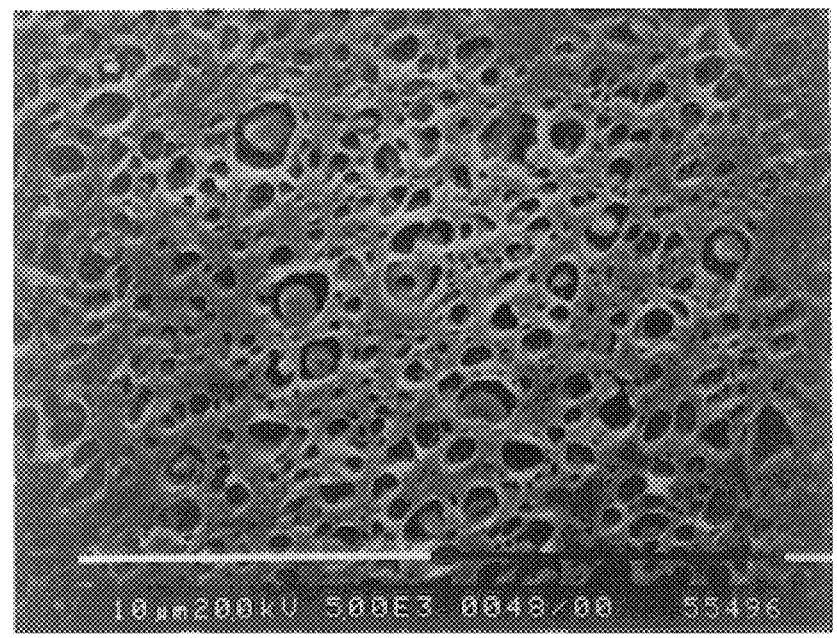
FIG. 2 is an SEM photograph of the composition of Example 11 from which the ethylene polymer (A) has been extracted in order to show nodules of PA 6—6 dispersed in the PBT matrix.
Figure 3:
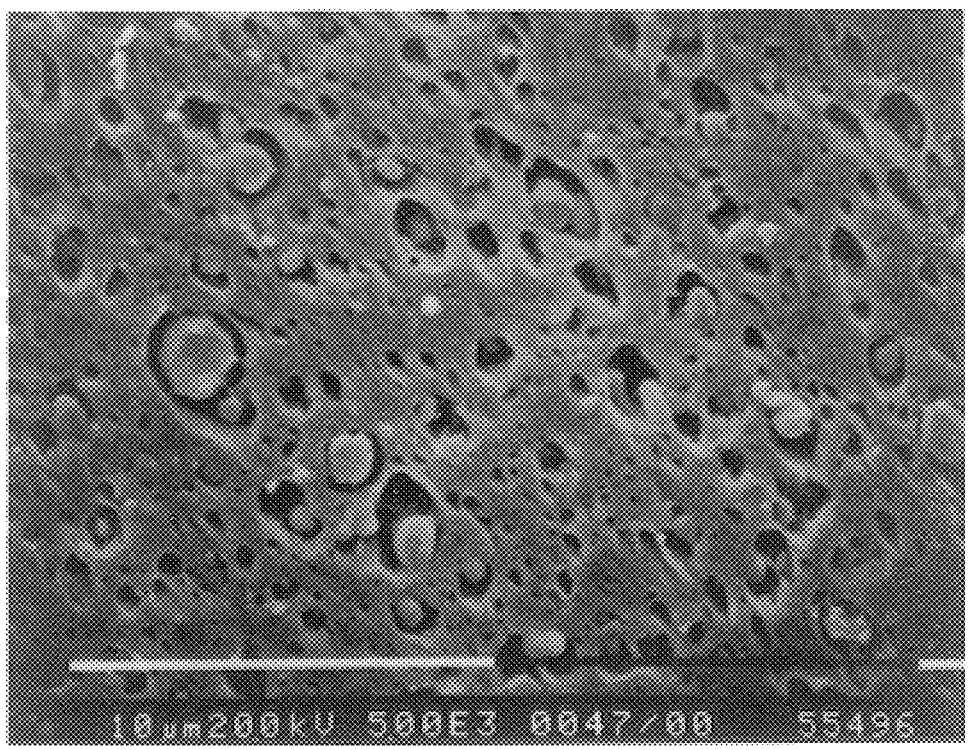
FIG. 3 is an SEM photograph of the composition of Example 12 from which the ethylene polymer (A) has been extracted in order to show nodules of PA 6—6 dispersed in the PA 12 matrix.

In the appended FIGS. 1, 2 and 3, which are photographs corresponding to the compositions of Examples 9, 11 and 12, inspected with the SEM after hot extraction of the terpolymer P1, nodules of PA 6—6 can be seen, devoid of their coating of terpolymer P1, which are dispersed in the matrix, respectively, of PA 6, FIG. 1, Example 9, of PBT, FIG. 2, Example 11 and of PA 12, FIG. 3, Example 12.

In Table 3 it is found that the elongation at the weld join line (WJL) of the composition according to the invention—Example 17—is greatly increased when compared with the elongation at the WJL of a single-phase composition (comparative Example 16).

In Table 2 Dv denotes the volume-average diameter of the nodules consisting of the ethylene polymer (A) and of the nodules of the ethylene polymer (A) partly encapsulating the thermoplastic resin (B).

TABLE 1

| EXAMPLE | COMPOSITION | | | TEMPERATURE (° C.) | | | | | Charpy impact strength (kJ/m²) | | | Flexural modulus (MPa) |
|---|---|---|---|---|---|---|---|---|---|---|---|---|
| | Mixture (I) | | Matrix | | | | | | | | | |
| | Terpolymer (A) Parts | Resin (B) Parts | Resin (C) Parts | TM 1 | TM 2 | TM 3 | TM 4 | TM 5 | 23° C. | −20° C. | −40° C. | |
| 1 Comparative | P0 / 100 | | PA12 / 400 | | | | | | NB | 40 | 15 | 860 |
| 2 | P1 / 55 | PA6−6 / 45 | PA12 / 177 | 270 | 270 | 215 | 225 | 230 | NB | 63 | 37 | 720 |
| 3 Comparative | P1 / 100 | | PBT / 400 | 200 | 220 | 230 | 240 | 240 | 35 | 34 | 22 | 1370 |
| 4 | P1 / 55 | PA6−6 / 45 | PBT / 177 | 275 | 250 | 215 | 225 | 235 | NB | 40 | 27 | 1250 |
| 5 Comparative | P1 / 100 | | PA6 / 400 | | | | | | 37 | 34 | 26 | 1030 |
| 6 | P1 / 55 | PA6−6 / 45 | PA6 / 177 | 225 | 235 | 240 | 240 | 245 | 52 | 34 | 25 | 840 |
| 7 | P1 / 55 | PA6−6 / 45 | PA6 / 177 | 275 | 250 | 210 | 220 | 235 | 42 | 31 | 21 | 570 |

TABLE 2

| EXAMPLE | COMPOSITION | | | TEMPERATURE (° C.) | | | | | Charpy impact strength (kJ/m²) | | | Flexural modulus (MPa) | Nodules | |
|---|---|---|---|---|---|---|---|---|---|---|---|---|---|---|
| | Mixture (I) | | Matrix | | | | | | | | | | Dv (μm) | % by volume >1 μm |
| | Terpolymer (A) Parts | Resin (B) Parts | Resin (C) Parts | TM 1 | TM 2 | TM 3 | TM 4 | TM 5 | 23° C. | −20° C. | −40° C. | | | |
| 8 Comparative | P1 / 60 | | PA6 / 234 | | | | | | | | | 1100 | 0.59 | 0 |
| 9 | P1 / 60 | PA6−6 / 40 | PA6 / 194 | 265 | 270 | 215 | 230 | 240 | 41.8 | 30.8 | 21.4 | 800 | 2.74 | 97 |
| 10 Comparative | P1 / 60 | | PBT / 234 | | | | | | 33 | 29 | 20 | 1400 | | |
| 11 | P1 / 60 | PA6−6 / 40 | PBT / 194 | 275 | 250 | 215 | 225 | 235 | NB | 40.5 | 26.6 | 1099 | 1.15 | 65 |
| ??? | | | PA12 | | | | | | 8.5 | 4.7 | 5.3 | 1022 | | |
| 12 | P1 / 60 | PA6−6 / 40 | PA12 / 194 | 270 | 270 | 215 | 225 | 230 | NB | 63.3 | 37.5 | 720 | 1.68 | 72 |

TABLE 3

| | COMPOSITION | | | KNEADING | | | | | TENSILE (WJL) | | | |
| | Mixture (I) | | Matrix | | | | | | THRESHOLD | | BREAK | |
| | Terpolymer (A) | Resin (B) | Resin (C) | TEMPERATURE (° C.) | | | | | Stress | Elong- | Break | Elong. |
| EXAMPLE | Parts | Parts | Parts | TM 1 | TM 2 | TM 3 | TM 4 | TM 5 | (MPa) | % | (MPa) | (%) |
| --- | --- | --- | --- | --- | --- | --- | --- | --- | --- | --- | --- | --- |
| 13 | P1/60 | PA6-6/40 | PA6/400 | 225 | 235 | 240 | 240 | 245 | 41.2 | 19.8 | 38.2 | 72 |
| 14 | P1/60 | PA6-6/40 | PA6/233 | 225 | 235 | 240 | 240 | 245 | 34.9 | 28.6 | 32.8 | 83 |
| 15 | P1/60 | PA6-6/40 | PA6/194 | 225 | 235 | 240 | 240 | 245 | 31.1 | 35.8 | 30.9 | 97 |
| 16 Comparative | P1/100 | | PA6/150 | 200 | 220 | 220 | 230 | 230 | | | 25 | 10 |
| 17 | P1/60 | PA6-6/40 | PA6/150 | 225 | 235 | 240 | 240 | 245 | 28.3 | 44.3 | 28.3 | 68 |

What is claimed is:

1. A process for preparing a multiphase thermoplastic composition comprising a mixture (I) that includes at least one ethylene polymer (A) which has units derived from unsaturated epoxy monomers or from unsaturated acid anhydride monomers, and at least one thermoplastic polyamide resin (B) which is partially encapsulated by the said ethylene polymer (A), the said mixture (I) being dispersed in a matrix that includes at least one thermoplastic polyamide or polyester resin (C), wherein the respective melting temperatures of said thermoplastic resins (B) and (C) are such that thermoplastic resin (B) remains partially encapsulated by ethylene polymer (A) during the manufacture or use of the said composition, which process comprises the steps:

producing a mixture (I) in at least the first zone of a kneading tool provided with at least two feed zones, moving said mixture (I) upstream from said first zone, and subsequently introducing the thermoplastic resin (C) into a zone situated upstream of the zone for mixing the constituents (A) and (B) of the mixture (I), and dispersing the said mixture (I) in the said thermoplastic resin (C).

2. The process according to claim 1, wherein 100 parts by weight of the mixture (I) include:

35 to 90 parts by weight of the ethylene polymer (A), and 10 to 65 parts by weight of at least one thermoplastic resin (B), and wherein said 100 parts of the mixture (I) are dispersed in a matrix that includes at least one thermoplastic resin (C).

3. The process according to claim 2, wherein said 100 parts of the mixture (I) are dispersed in 80 to 2000 parts by weight of a matrix that includes at least one thermoplastic resin (C).

4. The process according to claim 1, wherein the melting temperature of said thermoplastic resin (C) is lower than the melting temperature of said thermoplastic resin (B).

5. The process according to claim 1, wherein the ethylene polymer (A) is in the form of nodules and the thermoplastic resin (B) is in the form of nodules that are partially encapsulated by the said ethylene polymer (A).

6. The process according to claim 5, wherein the volume-average diameter Dv of all said nodules is at least 1 micron.

7. The process according to claim 6, wherein the volume-average diameter Dv of said nodules ranges from 1 micron to 3 microns.

8. The process according to claim 1, wherein the thermoplastic resin (C) is a polyester resin.

9. The process according to claim 1, wherein the ethylene polymer (A) is selected from the group consisting of ethylene/unsaturated epoxide copolymers and ethylene/alkyl (meth)acrylate/unsaturated epoxide terpolymers.

10. The process according to claim 9, wherein the ethylene polymer (A) is selected from the group consisting of ethylene/maleic anhydride copolymers and ethylene/alkyl (meth)acrylate/maleic anhydride copolymers.

11. The process of claim 1, wherein said dispersion of mixture (I) in resin (C) is carried out at a temperature that is higher than the melting point of resin (C).

* * * * *